(12) United States Patent
Zuo et al.

(10) Patent No.: US 10,886,757 B2
(45) Date of Patent: Jan. 5, 2021

(54) BATTERY PACK SYSTEM, CONTROL METHOD THEREOF AND MANAGEMENT DEVICE

(71) Applicant: Contemporary Amperex Technology Co., Limited, Ningde (CN)

(72) Inventors: Xiyang Zuo, Ningde (CN); Zhimin Dan, Ningde (CN); Wei Zhang, Ningde (CN); Yizhen Hou, Ningde (CN); Teng Yu, Ningde (CN); Wenbin Lu, Ningde (CN); Xingyuan Wu, Ningde (CN); Taosheng Zhu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 104 days.

(21) Appl. No.: 16/243,373

(22) Filed: Jan. 9, 2019

(65) Prior Publication Data

US 2019/0363550 A1 Nov. 28, 2019

(30) Foreign Application Priority Data

May 22, 2018 (CN) .......................... 2018 1 0494655

(51) Int. Cl.
*H02J 7/00* (2006.01)
*H01M 10/42* (2006.01)
(Continued)

(52) U.S. Cl.
CPC ......... *H02J 7/0021* (2013.01); *H01M 10/425* (2013.01); *H01M 10/441* (2013.01);
(Continued)

(58) Field of Classification Search
CPC ......... B60L 2240/545; B60L 2240/549; B60L 2240/80; B60L 58/13; B60L 58/25;
(Continued)

(56) References Cited

U.S. PATENT DOCUMENTS

2002/0070710 A1 6/2002 Yagi et al.
2013/0181682 A1 7/2013 Yoshioka
(Continued)

FOREIGN PATENT DOCUMENTS

CN 202042572 U 11/2011
CN 102917910 A 2/2013
(Continued)

OTHER PUBLICATIONS

The first Official Action and search report dated Oct. 9, 2019 for Chinese application No. 201810494655.7, 11 pages.
(Continued)

*Primary Examiner* — Vuthe Siek
(74) *Attorney, Agent, or Firm* — Law Offices of Liaoteng Wang (57) ABSTRACT

A battery pack system, a control method thereof and a management device are provided. A battery pack is connected in series with a discharge circuit unit and a charge circuit unit; a battery management unit is to monitor a temperature of the battery pack, to periodically send, when the temperature of the battery pack is lower than a threshold, a turn-on-instruction to the discharge circuit unit and the charge circuit unit alternately to control the discharge circuit unit and the charge circuit unit to be alternately turned on in heating cycles; the discharge circuit unit is to be turned on according to the turn-on-instruction to enable electricity of the battery pack to flow into the energy storage unit in discharging-phase; and the charge circuit unit is to be turned on according to the turn-on-instruction to enable electricity of the energy storage unit to flow into the battery pack in charging-phase.

17 Claims, 6 Drawing Sheets

(51) Int. Cl.
  *H01M 10/44* (2006.01)
  *H01M 10/48* (2006.01)

(52) U.S. Cl.
  CPC ....... *H01M 10/443* (2013.01); *H01M 10/482* (2013.01); *H01M 10/486* (2013.01); *H01M 2010/4271* (2013.01)

(58) Field of Classification Search
  CPC ............. H01M 10/425; H01M 10/441; H01M 10/443; H01M 10/482; H01M 10/486; H01M 10/615; H01M 10/63; H01M 10/657; H01M 2010/4271; H02J 7/00; H02J 7/0021; H02J 7/0029; H02J 7/0032
  See application file for complete search history.

(56) References Cited

U.S. PATENT DOCUMENTS

| | | | |
|---|---|---|---|
| 2013/0211642 A1 | 8/2013 | Blasinski | |
| 2014/0285135 A1* | 9/2014 | Ji | H01M 10/615 320/103 |
| 2016/0152151 A1 | 6/2016 | Yang et al. | |
| 2016/0185251 A1 | 6/2016 | Stefanopoulou | |
| 2017/0264105 A1 | 9/2017 | Sturnfield | |

FOREIGN PATENT DOCUMENTS

| | | |
|---|---|---|
| CN | 103222105 A | 7/2013 |
| CN | 103560307 A | 2/2014 |
| CN | 104249629 A | 12/2014 |
| CN | 102742068 B | 1/2016 |
| CN | 104638318 B | 11/2016 |
| CN | 107394284 A | 11/2017 |
| FR | 3051155 A1 | 11/2017 |

OTHER PUBLICATIONS

The extended European search report dated Jun. 18, 2019 for European application No. 19151169.0, 9 pages.
The Examination Report dated Jan. 15, 2020 for European application No. 19151169.0, 7 pages.
The Third Official Action and search report dated Nov. 3, 2020 for Chinese application No. 201810494655.7, 24 pages.

* cited by examiner

BATTERY PACK SYSTEM, CONTROL METHOD THEREOF AND MANAGEMENT DEVICE

CROSS REFERENCE TO RELATED APPLICATION

The present application is based upon and claims the benefits of Chinese Patent Application No. 201810494655.7 filed on May 22, 2018, the entire contents of which are incorporated herein by reference.

FIELD

The present disclosure generally relates to batteries, and more particularly to a battery pack system, a control method thereof and a management device.

BACKGROUND

With a widespread use of new energy sources, a battery pack may be used as a power source in various fields. Environment in which the battery pack is used as a power source may be different, and the performance of the battery pack may also be affected. For example, the performance of a battery pack in a low temperature environment is considerably reduced compared to that of a normal temperature environment. For example, at a temperature of zero, a discharge capacity of the battery pack will decrease as the temperature decreases. At −30° C., the discharge capacity of the battery pack is substantially zero, resulting in the battery pack being unusable.

In order to be able to use the battery pack in a low temperature environment, it is necessary to preheat the battery pack before using the battery pack. At present, the battery pack may be preheated by a battery separator heating method. The battery separator heating method is to add a heating plate or a heating film between the battery cells, take electricity from a power grid, and heat the heating plate or the heating film to achieve the purpose of heating the battery pack. However, it takes a long time to heat the battery pack using the battery separator heating method. For example, it takes several hours to increase the temperature of the battery pack from −30° C. to 0° C., which may affect the use of the battery pack.

SUMMARY

The present disclosure provides a battery pack system, a control method thereof and a management device.

In a first aspect, a battery pack system is provided in the present disclosure. The battery pack system comprises a battery pack, a battery management unit, a discharge circuit unit, a charge circuit unit and an energy storage unit, wherein the battery pack is connected in series with the discharge circuit unit, and the battery pack is connected in series with the charge circuit unit; the battery management unit is connected to the discharge circuit unit, the charge circuit unit and the battery pack, the battery management unit is configured to monitor a temperature of the battery pack, so as to periodically send, when the temperature of the battery pack is lower than a first temperature threshold, a turn-on instruction to the discharge circuit unit and the charge circuit unit alternately to control the discharge circuit unit and the charge circuit unit to be alternately turned on in each of heating cycles, wherein each of the heating cycles comprises a discharging phase and a charging phase; the discharge circuit unit is connected to the energy storage unit, and the discharge circuit unit is configured to turn on the discharge circuit unit according to the turn-on instruction to enable electricity of the battery pack to flow into the energy storage unit in the discharging phase; the charge circuit unit is connected to the energy storage unit, and the charge circuit unit is configured to turn on the charge circuit unit according to the turn-on instruction to enable electricity of the energy storage unit to flow into the battery pack in the charging phase; the energy storage unit is configured to store and release electricity; and a total duration of discharging phases of all of the heating cycles is greater than a total duration of charging phases of all of the heating cycles.

In a second aspect, a method for controlling a battery pack system is provided in the present disclosure. The method may be used in the above battery pack system and includes: monitoring a temperature of the battery pack; and periodically sending, when the temperature of the battery pack is lower than a first temperature threshold, a turn-on instruction to the discharge circuit unit and the charge circuit unit alternately to enable electricity to be transferred between the battery pack and the energy storage unit in heating cycles, wherein each of the heating cycles comprises a discharging phase and a charging phase, and a total duration of discharging phases of all of the heating cycles is greater than a total duration of charging phases of all of the heating cycles.

In a third aspect, a management device is provided in the present disclosure. The management device comprises a memory, a processor and a program stored in the memory and executable in the processor, wherein the program, when executed by the processor, causes the processor to perform the above method for controlling a battery pack system.

Embodiments of the present disclosure provide a battery pack system, a control method thereof, and a management device. During each heating cycle, the discharge circuit unit and the charge circuit unit are alternately turned on, so that the electricity may be circulated between the battery pack and the energy storage unit. The battery pack is cyclically charged and discharged, and the current generated during the charging and discharging of the battery pack continuously flows through the internal resistance of the battery pack to generate heat, that is, the battery pack is heated with the heat generated inside the battery pack itself. Moreover, the heat generated during the discharging phase is greater than the heat generated during the charging phase, and the total duration of the discharging phase in all heating cycles is set to be greater than the total duration of the charging phase in all heating cycles. This may allow more heat to be generated for heating during the same heating time. This may further increase the speed of heating the battery pack and reduce the time required to heat the battery pack.

BRIEF DESCRIPTION OF THE DRAWINGS

The present disclosure will be better understood by reading the following detailed description with reference to the appended drawings, in which the same or similar numerals represent the same or similar features.

DETAILED DESCRIPTION

Features of various aspects and exemplary embodiments of the present disclosure will be described in detail below. In the following detailed description, many specific details are disclosed to provide a thorough understanding of the present disclosure. However, it is apparent to a person skilled in the art that the present disclosure may be practiced without some of these specific details. The following descriptions of embodiments are merely to provide a better understanding of the present disclosure through illustrating examples of the present disclosure. The present disclosure is by no means limited to any specific configuration and algorithm disclosed below, but rather covering any modification, substitution, and improvement of elements, components, and algorithms without departing from the spirit of the present disclosure. In the appended drawings and the following descriptions, well-known structures and techniques are not illustrated to avoid unnecessarily obscuring the present disclosure.

Embodiments of the present disclosure provide a battery pack system and a method for controlling the battery pack system, which may be applied to a device powered by the battery pack to rapidly heat the battery pack in a low temperature environment. The device powered by the battery pack may be an electrically driven vehicle such as an electric car, an electric boat, and the like. The device powered by the battery pack may also be used in other fields, such as the military field. The battery pack may be a battery module or a battery pack, etc., which is not limited herein.

The device powered by the battery pack needs to operate in a low temperature environment under certain conditions. For example, in winter, an electric vehicle may run in an environment where the temperature is below 0° C. Due to the low temperature environment, among other things, viscosity of electrolyte may increase and a serious lithium deposition in negative electrode material may occur in the battery pack, which may make the device powered by the battery pack difficult to operate. In order to make the device powered by the battery pack normally operate in the low temperature environment, the battery pack needs to be preheated. In an embodiment of the present disclosure, the battery pack is arranged with a battery pack system. In each heating cycle, the battery pack and an energy storage unit in the battery pack system may transfer electricity to each other. During the electricity transmission, a current flows through the battery pack and heat is generated inside the battery pack. The heat generated inside the battery pack may heat the battery pack from the inside of the battery pack. Total duration of discharging phases that generates more heat may be set to be greater than total duration of charging phases that generates less heat, so that speed of heating the battery pack may be further increased and the time to heat the battery pack may be reduced. As a result, the device may operate as quickly as possible based on the electricity of the battery pack in the low temperature environment.

Figure 1:
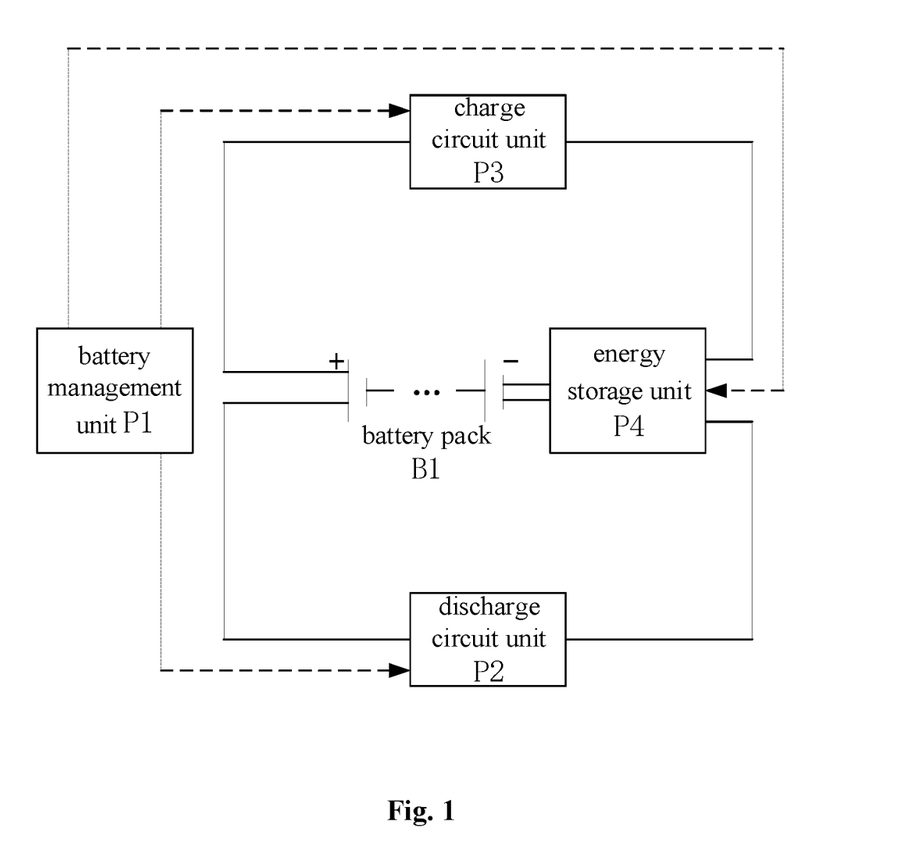
FIG. 1 is a structure diagram of a battery pack system according to an embodiment of the present disclosure.

Below, the battery pack will be described as an example of a power battery pack in an electric car. FIG. 1 is a structure diagram of a battery pack system according to an embodiment of the present disclosure. As shown in FIG. 1, the battery pack system includes a battery pack B1, a battery management unit P1, a discharge circuit unit P2, a charge circuit unit P3, and an energy storage unit P4. The dotted arrow connection in FIG. 1 refers to a communication connection, and may specifically be a wired connection or a wireless connection, which is not limited herein. For example, the battery management unit P1 may transmit information with the discharge circuit unit P2, the charge circuit unit P3 and the battery pack B1 using a controller area network (CAN) bus. The information transmitted in the communication connection may include a turn-on instruction, temperature information, and the like, which are not limited herein. The solid line connection in FIG. 1 refers to an electrical connection.

The battery pack B1 may be connected in series with the discharge circuit unit P2, and the battery pack B1 may be connected in series with the charge circuit unit P3.

The battery pack B1 may be a power battery pack in an electric car. The battery pack system may be arranged inside the electric car.

The battery management unit P1 may be connected to the discharge circuit unit P2, the charge circuit unit P3 and the battery pack B1. The battery management unit P1 may be configured to monitor a temperature of the battery pack B1, so as to periodically send, when the temperature of the battery pack B1 is lower than a first temperature threshold, a turn-on instruction to the discharge circuit unit P2 and the charge circuit unit P3 alternately to control the discharge circuit unit P2 and the charge circuit unit P3 to be alternately turned on in each of heating cycles.

The heating cycle may include a discharging phase and a charging phase. During the discharging phase, the discharge circuit unit is turned on, the charge circuit unit is turned off, the battery pack B1 releases electricity, and the electricity is input to the energy storage unit P4. During the charging phase, the charge circuit unit is turned on, the discharging circuit unit is turned off, the energy storage unit P4 releases electricity, and the electricity is input into the battery pack B1.

In an example, the battery management unit P1 may be a battery management system (BMS), or may be a separately disposed function unit, which is not limited herein. A temperature sensor for measuring temperature may be disposed on a surface of the battery pack B1 or inside the battery pack B1. The temperature sensor may transmit the measured temperature of the battery pack B1 to the battery management unit P1. The battery management unit P1 may determine whether to periodically send a turn-on instruction to the discharge circuit unit P2 and the charge circuit unit P3 alternatively based on the temperature of the battery pack B1 obtained from the temperature sensor and the first temperature threshold.

A temperature detecting unit may be disposed in the battery management unit P1. The temperature detecting unit may collect the temperature of the battery pack B1 at a certain frequency. The temperature detecting unit may use a thermistor. The thermistor may be a negative temperature coefficient (NTC) thermistor, a positive temperature coefficient (PTC) thermistor, etc., which is not limited herein. The temperature of the battery pack B1 may also be uploaded to the battery management unit P1 by the temperature sensor disposed on the surface of the battery pack B1 or inside the battery pack B1 at a certain frequency. Embodiments of the present disclosure are not limited in this respect.

The first temperature threshold is the lowest temperature at which the battery pack B1 can supply power normally. When the temperature of the battery pack B1 is lower than the first temperature threshold, it may be indicated that the battery pack B1 enters a low temperature state in which the battery pack B1 cannot supply power normally. For example, the first temperature threshold may be set to 0° C. Therefore, in a case where the temperature of the battery pack B1 is lower than the first temperature threshold, the battery pack B1 is heated to increase the temperature of the battery pack B1 until the temperature of the battery pack B1 reaches a temperature at which the battery pack B1 can normally supply power.

It should be noted that when the discharge circuit unit P2 is turned on, the battery pack B1 and the discharge circuit unit P2 are connected in series, so that the battery pack B1, the discharge circuit unit P2 and the energy storage unit P4 may form a path loop. When the charge circuit unit P3 is turned on, the battery pack B1 and the charge circuit unit P3 are connected in series, so that the battery pack B1, the charge circuit unit P3 and the energy storage unit P4 may form a path loop.

The turn-on instruction may be specifically implemented by a pulse voltage. For example, a high level voltage is the turn-on instruction and a low level voltage is a turn-off instruction. With the setting of the pulse voltage, frequency of turn-on and turn-off of the discharge circuit unit P2 and the charge circuit unit P3 may be adjusted, so that transmission of the electricity between the battery pack B1 and the energy storage unit P4 may be adjusted.

In an example, the battery management unit P1 described above may also be used to monitor state of charge (SOC) of the battery pack B1. The SOC of the battery pack may refer to a ratio of remaining electricity to the rated capacity under the same condition at a certain discharge rate. When the temperature of the battery pack B1 is lower than the first temperature threshold and the SOC of the battery pack B1 is higher than a SOC threshold, the turn-on instruction may be periodically and alternately sent to the discharge circuit unit P2 and the charge circuit unit P3.

That is to say, in a scenario where the temperature of the battery pack B1 does not reach the lowest temperature at which it can normally supply power, it may be further detected whether the electricity currently stored by the battery pack B1 is sufficient for heating the battery pack B1. The SOC threshold is the minimum SOC that can support the heating of the battery pack. The SOC threshold may be set according to work scenarios and work requirements, which are not limited herein. For example, the SOC threshold may be set to 30%.

It should be noted that in order to ensure the safety of the device powered by the battery pack, safety inspection may be performed on the device powered by the battery pack before the temperature and the SOC of the battery pack is monitored. When it is determined that the device powered by the battery pack is in a normal operation state, the temperature and the SOC of the battery pack may be judged. For example, if the battery pack system is installed inside the electric car, and the battery management unit P1 in the battery pack system is the BMS of the electric car, an insulation detection may be performed on the electric car after the battery pack is powered on. Also, a high-voltage detection may be performed on the battery pack. After it is determined that the electric car is in a normal operation state, process of heating the battery pack may be ready to be started.

In an example, the battery management unit P1 may also be configured to send a turn-off instruction to the discharge circuit unit P2 and the charge circuit unit P3 to disconnect the battery pack B1 from the discharge circuit unit P2 and the charge circuit unit P3 when the temperature of the battery pack B1 is higher than a second temperature threshold.

The second temperature threshold is the temperature at which the battery pack B1 can resume normal operation. When the temperature of the battery pack B1 reaches the second temperature threshold, it may be indicated that the battery pack B1 has resumed normal operation, and the heating of the battery pack B1 may be stopped. Specifically, a turn-off instruction may be sent to the discharge circuit unit P2 and the charge circuit unit P3 to control the discharge circuit unit P2 and the charge circuit unit P3 to be turned off. When the discharge circuit unit P2 and the charge circuit unit P3 are turned off, the loop formed by the battery pack B1, the discharge circuit unit P2 and the energy storage unit P4 is broken, and the loop formed by the battery pack B1, the charge circuit unit P3 and the energy storage unit P4 is broken. There is no current flowing in the loop that is broken, therefore the electricity cannot be transferred between the battery pack B1 and the energy storage unit P4.

The discharge circuit unit P2 is connected to the energy storage unit P4 and may be used to turn on the discharge circuit unit P2 according to the turn-on instruction, so that the electricity of the battery pack B1 may flow into the energy storage unit P4 during the discharging phase. As above, the discharge circuit unit P2 may be turned on according to the received turn-on instruction, and the battery pack B1, the discharge circuit unit P2 and the energy storage unit P4 may form a path loop. The battery pack B1 may release electricity, and the electricity released from the battery pack B1 may flow into the energy storage unit P4. The energy storage unit P4 is capable of storing the electricity released by the battery pack B1. It should be noted that the electricity released by the battery pack B1 may be converted into electromagnetic energy and stored in the energy storage unit P4.

The charge circuit unit P3 is connected to the energy storage unit P4 and may be used to turn on the charge circuit unit P3 according to the turn-on instruction, so that the electricity of the energy storage unit P4 may flow into the battery pack B1 during the charging phase. As above, the charge circuit unit P3 may be turned on according to the received turn-on instruction, and the battery pack B1, the charge circuit unit P3 and the energy storage unit P4 may form a path loop. The energy storage unit P4 may releases electricity, and the electricity released by the energy storage unit P4 may flow into the battery pack B1 to charge the battery pack B1.

The above energy storage unit P4 may be a structure having a function of storing electricity such as an inductive element, a capacitive element, or a storage battery. The present disclosure is not limited in this respect. The energy storage component may specifically convert electricity into electromagnetic energy and store it in the energy storage component, and may convert the stored electromagnetic energy into electricity for release. In an example, the energy storage unit P4 that matches attribute parameters of a work scenario and a work requirement may be selected, and magnitude and flow direction of the current of the path between the battery pack B1 and the battery pack system may be controlled, so that an alternating current that is changing periodically at a positive electrode and a negative electrode of the battery pack B1 may heat the battery pack B1. The energy storage unit P4 may include a plurality of inductors or capacitors connected in series and/or in parallel to reduce the selection requirements of the component parameters for the energy storage unit P4.

For example, the energy storage unit P4 includes an inductor coil. Amount of electromagnetic energy stored by the inductor coil may be illustrated in equation (1):

$$W=(\tfrac{1}{2})I^2 L \qquad (1).$$

In equation (1), W is the amount of electromagnetic energy stored in the inductor coil; I is the current in the inductor coil, that is, the current of the path formed by the battery pack B1 and the battery pack system; and L is the inductance of the inductor coil. The variation of the current I in the inductor coil with time may be illustrated in equation (2):

$$I(t)=Ie^{-(Rx/L)t} \qquad (2).$$

In equation (2), t is time; Rx is internal resistance of the battery pack. From equation (1) and equation (2), in the process of designing the battery pack system, in order to heat the battery pack, the inductance of the inductor coil that matches the operating scenario and the operating requirement may be selected and the current of the path of the battery pack system may be controlled.

In an embodiment of the present disclosure, in each heating cycle, the discharge circuit unit P2 and the charge circuit unit P3 may be alternately turned on, so that the electricity may reciprocates between the battery pack B1 and the energy storage unit P4. For the battery pack B1, it is cyclically discharged and charged until it is no longer necessary to heat the battery pack B1. According to the Joule theorem $Q=I^2 R \times T$, the battery pack B1 is cyclically charged and discharged, and then the current generated during the charging and discharging of the battery pack B1 may continuously flow through the internal resistance of the battery pack B1 to generate heat. As a result, the battery pack B1 may be heated by the heat generated inside the battery pack B1, so that the speed of heating the battery pack is increased, the time required for heating the battery pack is reduced, and the utilization of energy in heating of the battery pack is improved. Q is the heat generated by the battery pack B1; I is the current flowing through the battery pack B1, that is, the current of the path of the battery pack system; and T is the time period during which the current flows through the battery pack B1. Moreover, in the embodiments of the present disclosure, since the battery pack is heated by the heat generated by itself, the heat generated by the battery pack may be evenly distributed inside each of battery cells of the battery pack. As a result, uniform heating of the battery pack can be realized.

Especially for a high-voltage power battery pack, such as a battery pack having tens to hundreds of volts of voltage. The current in the path of the battery pack system may be as high as hundreds of amperes. The hundreds of amperes of current flows through the internal resistance of the battery pack, which may generate higher heat so as to speed up the heating of the battery pack and reduce the time required to heat the battery pack.

Moreover, the discharge circuit unit P2 and the charge circuit unit P3 may be continuously and periodically controlled to be alternately turned on, that is, the battery pack B1 may periodically discharge and charge without interruption. In this way, an uninterrupted current may be generated in the path of the battery pack system, so as to uninterruptedly generate heat. As a result, the speed of heating the battery pack can be increased and the time required to heat the battery pack can be decreased.

In an embodiment of the present disclosure, the heating cycle, the duration of the discharging phase and the duration of the charging phase in the heating cycle may be set in advance. According to the structure of the battery pack system, it can be obtained through calculation that during the heating cycle, the heat generated in the discharging phase is higher than the heat generated in the charging phase. In order to get as much heat as possible over a period of time, the total duration of the discharging phases of all heating cycles may be set to be greater than the total duration of the charging phases of all heating cycles. The longer the total duration of the discharging phases, the more heat is generated. Therefore, the total duration of the discharging phases of all heating cycles being greater than the total duration of the charging phases of all heating cycles may generate more heat, so that the speed of heating the battery pack may be further increased and the time required to heat the battery pack may be further decreased.

Specifically, the duration of each heating cycle may be the same or different. The duration of the discharging phase in different heating cycles may be the same or different. The duration of the charging phase in different heating cycles may be the same or different. In an example, for each heating cycle, the duration of the discharging phase is greater than the duration of the charging phase.

Figure 2:
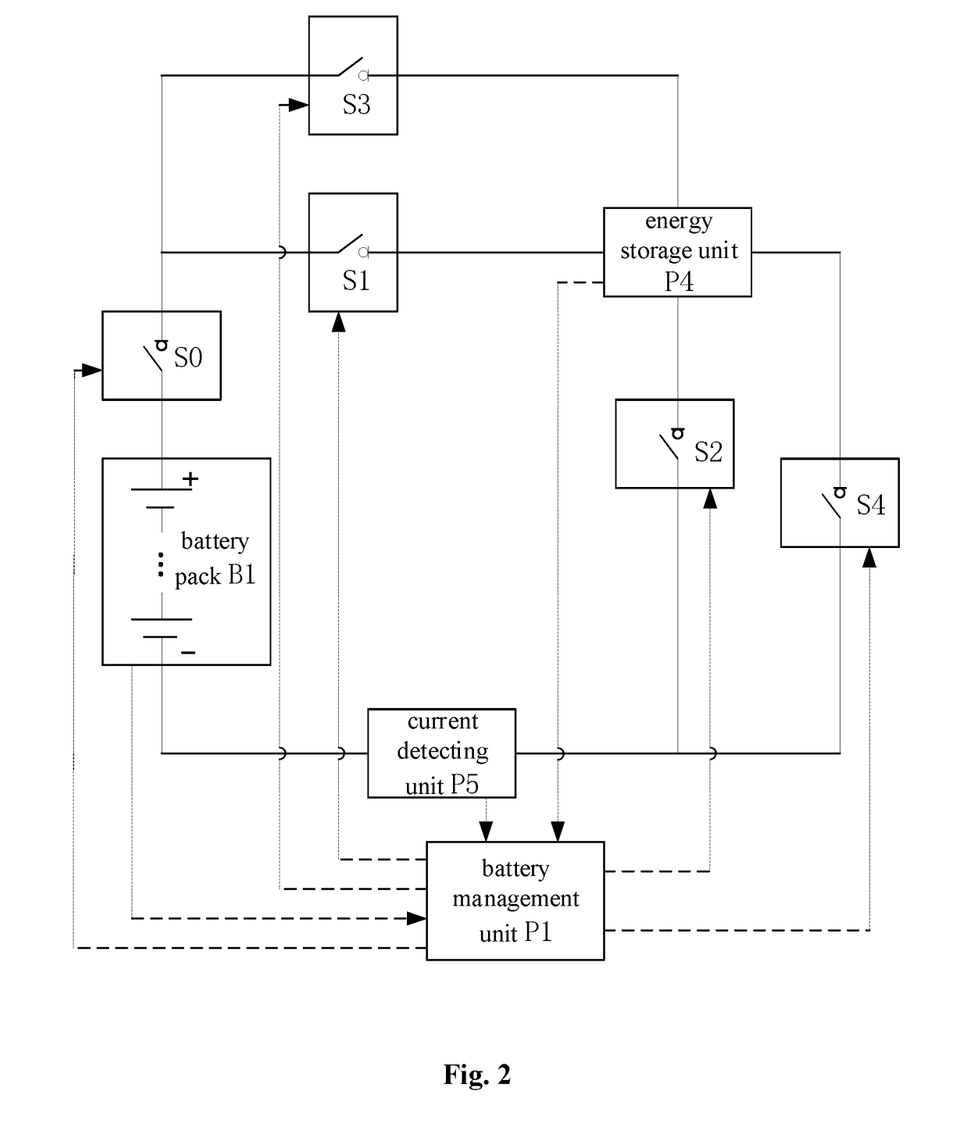
FIG. 2 is a schematic structure diagram of a battery pack system according to an embodiment of the present disclosure.

Structure of a specific battery pack system will be taken as an example to illustrate that the heat generated in the discharging phase is higher than the heat generated in the charging phase. FIG. 2 is a schematic structure diagram of a battery pack system according to an embodiment of the present disclosure. The discharge circuit unit P2 shown in FIG. 2 may include a first switch S1 and a second switch S2 which are connected in series. The charge circuit unit P3 shown in FIG. 2 may include a third switch S3 and a fourth switch S4 which are connected in series. The battery pack system shown in FIG. 2 may further include a main switch unit and a current detecting unit P5. In FIG. 2, the main switch unit may be a main switch S0, for example.

It should be noted that the dotted arrow connection in FIG. 2 may refer to a communication connection, specifically a wired connection or a wireless connection, which is not limited herein. For example, the battery management unit P1 may transmit information with the main switch S0, the first switch S1, the second switch S2, the third switch S3, the fourth switch S4, the energy storage unit P4, the current detecting unit P5 and the battery pack B1 using a controller area network (CAN) bus. The information transmitted in the communication connection may include a turn-on instruction, current information, temperature information, etc., which is not limited herein. The solid line connection in FIG. 2 may refer to an electrical connection.

It should be noted that, the discharge circuit unit P2 and the charge circuit unit P3 may also use a different number of switches from that shown in FIG. 2, or other similar components in function may be used instead of the above switches. The present disclosure is not limited in this respect.

The main switch unit may be connected to the battery pack, and the main switch unit may be used to control whether the electricity of the battery pack B1 flows into the discharge circuit unit P2 or the charge circuit unit P3. The battery management unit P1 may control the turning on and turning off of the loop inside the battery pack system by controlling the main switch unit. The main switch unit may also separate the battery pack system from other power circuits and power-driven parts in the device powered by the battery pack B1, so as to avoid harmful influence from the battery pack system to other power circuits and power-driven parts of the device powered by the battery pack B1 in the case where the battery pack B1 is not required to be heated by the battery pack system.

The first switch S1 and the second switch S2 in the discharge circuit unit P2 are both connected to the energy storage unit P4. The first switch S1 is connected to the positive electrode of the battery pack, and the second switch S2 is connected to the negative electrode of the battery pack.

When the discharge circuit unit P2 is turned on, both of the first switch S1 and the second switch S2 are closed. When the discharge circuit unit P2 is turned off, both of the first switch S1 and the second switch S2 are open. When the discharge circuit unit P2 is turned on, the current flows through the positive electrode of the battery pack B1, the main switch S0, the first switch S1, the energy storage unit P4, the second switch S2, the current detecting unit P5, and finally the negative electrode of the battery pack B1.

The third switch S3 and the fourth switch S4 in the charge circuit unit P3 are both connected to the energy storage unit P4. The third switch S3 is connected to the positive electrode of the battery pack, and the fourth switch S4 is connected to the negative electrode of the battery pack.

When the charge circuit unit P3 is turned on, both of the third switch S3 and the fourth switch S4 are closed. When the charge circuit unit P3 is turned off, both of the third switch S3 and the fourth switch S4 are open. When the charge circuit unit P3 is turned on, the current flows through a terminal of the energy storage unit P4, the third switch S3, the main switch S0, the positive electrode of the battery pack B1, the negative electrode of the battery pack B1, the current detecting unit P5, the fourth switch S4, and finally another terminal of the energy storage unit P4.

Adjusting frequency in the above embodiments may be considered as the switching frequency of the switches in the discharge circuit unit P2 and the charge circuit unit P3. For example, in FIG. 2, the adjusting frequency is the switching frequency of the first switch S1, the second switch S2, the third switch S3, and the fourth switch S4.

It should be noted that, in the case where the current of the path of the battery pack system is large, for example, hundreds of amperes, in order to ensure the normal operation and safety of the battery pack system, the switches in the main switch unit and the discharge circuit unit P2, for example, the main switch S0, the first switch S1 and the second switch S2 in FIG. 2, may specifically be high-power switches, such as a metal oxide semiconductor (MOS) tube, a relay or an insulated gate bipolar transistor (IGBT), etc. The switches in the charge circuit unit P3, such as the third switch S3 and the fourth switch S4 in FIG. 2, may be a power MOS transistor, an IGBT, a high power diode or a fast recovery diode.

The heating cycle, the duration of the discharging phase and the duration of the charging phase of the heating cycle may be preset for the battery management unit. The battery management unit may send the turn-on instruction to the first switch and the second switch in the discharge circuit unit, and the third switch and the fourth switch in the charge circuit unit based on the preset heating cycle, the duration of the discharging phase and the duration of the charging phase of the heating cycle.

In this example, in order to further speed up the heating of the battery pack, the duration of the discharging phase may be set to be longer than the duration of the charging phase.

In the battery pack system shown in FIG. 2, for example, the energy storage unit may be an inductive device, and the inductance of the energy storage unit may be L1; the voltage of the battery pack may be Up; the duration of the discharging phase may be t1; and the duration of the charging phase may be t2; the current of the path formed by the battery pack system in the discharging phase may be Id; the current of the path formed by the battery pack system in the charging phase may be Ic; the internal resistance of the battery pack when it is discharged may be Rd; the internal resistance of the battery pack when it is charged may be Rc; the conduction voltage drop of the switch(s) may be Vsat; the heat generated by the battery pack in the discharging phase may be Qd; and the heat generated by the battery pack in the charging phase may be Qc.

Figure 3:
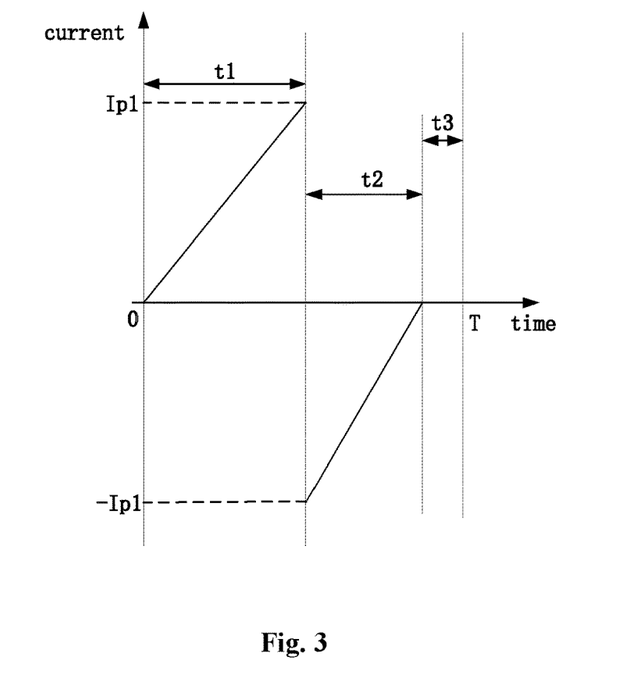
FIG. 3 is a schematic diagram showing a current waveform of a battery pack during a heating cycle according to an example of an embodiment of the present disclosure.

FIG. 3 is a schematic diagram showing a current waveform of a battery pack during a heating cycle according to an example of an embodiment of the present disclosure. As shown in FIG. 3, in the discharging phase, change rate of the current generated at both terminals of the energy storage unit, that is, change rate of the current of the path of the battery pack system is K1=(Up−3×Vsat)/L1. Therefore, the heat generated by the battery pack during the discharging phase may be illustrated in equation (3):

$$Qd = Id^2 \times Rd \times t1 = \int_0^{t1} (K1 \times t)^2 \times Rd \, dt = \frac{Rd(Up - 3 \times Vsat)^2 t1^2}{3L1^2}. \quad (3)$$

After the end of the discharging phase, the charging phase comes. In the charging phase, the change rate of the current generated at both terminals of the energy storage unit, that is, the change rate of the current of the path of the battery pack system is K2=(Up+3×Vsat)/L1. Moreover, since the charging phase is immediately after the end of the discharging phase, the magnitude of the current in the path of the battery pack system is constant, but the direction of the current in the charging phase is opposite to that of the discharging phase. Therefore, the duration of the charging phase may be illustrated in equation (4):

$$t2 = \frac{(Up - 3 \times Vsat) \times t1}{Up + 3 \times Vsat}. \quad (4)$$

The duration of the discharging phase t1 is greater than the duration of the charging phase t2. In an example, if the duration of the heating cycle is T, in the case of t1≤T/2, the heating cycle may also include a dead-time phase. During the dead-time phase, both of the discharge circuit unit and the charge circuit unit are turned off. That is, upon entering the dead-time phase, the battery management unit may send a turn-off instruction to the discharge circuit unit and the charge circuit unit. During the dead-time phase, no current flows through the battery pack system and the heating process is interrupted. The duration of the dead-time phase is the dead-time period. The energy storage device may be energized up to full during the discharging phase of the heating cycle, and the energy in the energy storage device may be fully released during the charging phase of the heating cycle. The dead-time phase may be immediately followed by the charging phase. The dead-time phase may be set to avoid a false trigger when the switch(es) controls reversal of the current direction in order to ensure the safety of the battery pack system. As shown in FIG. 3, the duration of the dead-time phase is t3.

In the charging phase, the heat generated by the battery pack may be an absolute value of Qc. The heat Qc generated by the battery pack in the charging phase may be illustrated in equation (5):

$$Qc = Ic^2 \times Rc \times t2 = \int_{t1}^{t1+t2} (K2 \times t - K1 \times t1 - K2 \times t2)^2 \times Rc\, dt = \quad (5)$$

$$-\frac{6 \times RcVsat\, t1^3 (Up^2 + 3Vsat^2)}{L1^2 \times (Up + 3Vsat)}.$$

Since the voltage Up of the battery pack is far larger than the conduction voltage drop Vsat of the switch(es), Up−3×Vsat Up≈Up+3×Vsat. From the equation (5), equation (6) can be obtained as follows:

$$\frac{Qd}{|Qc|} = \frac{Rd(Up + 3Vsat)}{18RcVsat}. \quad (6)$$

Figure 4:
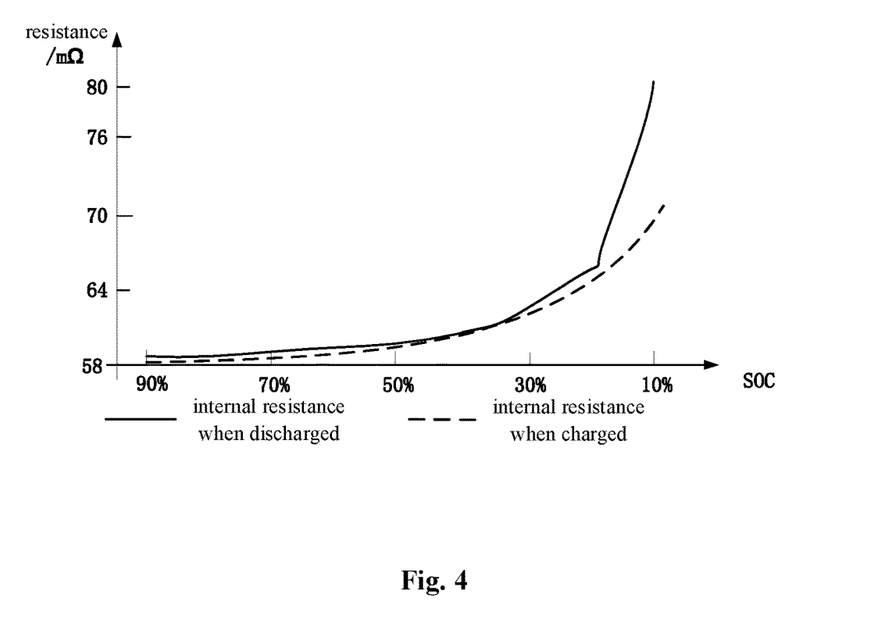
FIG. 4 is a schematic diagram showing changes in internal resistance of a battery pack during charging and discharging of the battery pack according to an example of an embodiment of the present disclosure.

FIG. 4 is a schematic diagram showing changes in internal resistance of a battery pack during charging and discharging of the battery pack according to an example of an embodiment of the present disclosure. As shown in FIG. 4, under the same conditions, the internal resistance of the battery pack when it is discharged is greater than the internal resistance of the battery pack when it is charged. Furthermore, since the voltage Up of the battery pack may be much larger than the conduction voltage drop Vsat of the switch(es), for example, Up>15Vsat, then Qd is larger than |Qc|. That is to say, the heat generated by the discharging of the battery pack is greater than the heat generated by the charging of the battery pack. Therefore, the duration of the discharging phase may be set to be longer than the duration of the charging phase, so that the battery pack may generate more heat and the speed of heating the battery pack may be further increased.

The current detecting unit P5 may be connected to the battery pack, the battery management unit P1, the discharge circuit unit P2, and the charge circuit unit P3. The current detecting unit P5 may be used to detect the current of the path of the battery pack system.

In FIG. 2, the current detecting unit P5 is connected to the negative electrode of the battery pack B1, the second switch S2, and the fourth switch S4. For example, the current detecting unit P5 may be a current sensor unit (CSU). When the discharge circuit unit P2 is turned on, the current detecting unit P5 may collect the current in the path loop formed by the battery pack B1, the main switch S0, the first switch S1, the energy storage unit P4, and the second switch S2. It should be noted that the current detecting unit P5 is also located in the path loop formed by the turning on of the discharging loop unit P2. When the charge circuit unit P3 is turned on, the current detecting unit P5 may collect the current in the path loop formed by the energy storage unit P4, the third switch S3, the main switch S0, the battery pack B1, and the fourth switch S4. It should be noted that the current detecting unit P5 is also located in the path loop formed by the turning on of the charge circuit unit P3.

In an example, the battery management unit P1 may also be used to send, in the charging phase, a turn-off instruction to the charge circuit unit if the current of the path of the battery pack system reaches a charging current threshold.

The charging current threshold is a limit value that affects chemical reactions of the battery pack when the battery pack is charged at the current temperature, and may be set according to different battery packs and different requirements. The charge current threshold may vary for different types of battery packs and for battery packs at different temperatures.

Figure 5:
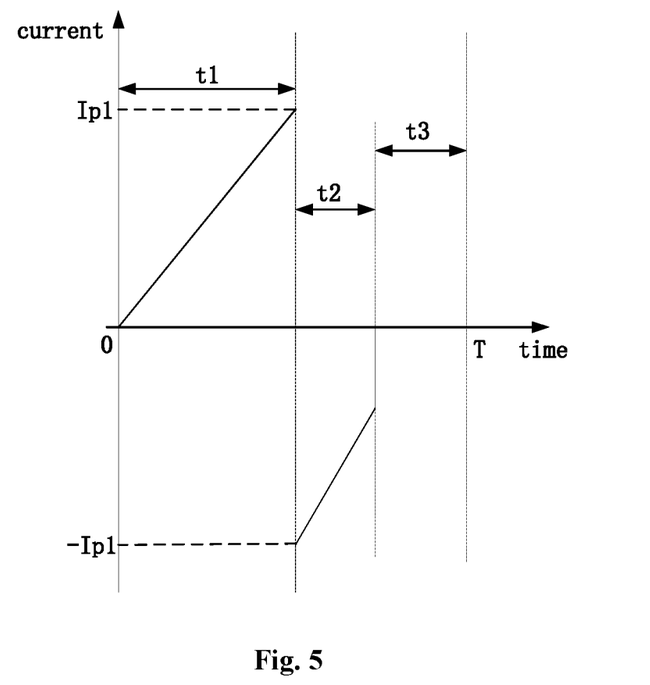
FIG. 5 is a schematic diagram showing a current waveform of a battery pack during a heating cycle according to another example of an embodiment of the present disclosure.

For example, FIG. 5 is a schematic diagram showing a current waveform of a battery pack during a heating cycle according to another example of an embodiment of the present disclosure. As shown in FIG. 5, the duration of the discharging phase is t1; the duration of the charging phase is t2; and the duration of the dead-time phase is t3. When the magnitude of the current in the path of the battery pack system is reduced to the charging current threshold, the charging phase ends and the dead-time phase of the heating cycle comes. In the case where the current of the path of the battery pack system is greater than the charging current threshold, the effect of the charging of the battery pack on the chemical reactions inside the battery pack is not obvious and may be negligible. In the case where the current of the path formed by the battery pack system is smaller than the charging current threshold, the charging of the battery pack may have a significant influence on the chemical reactions inside the battery pack, which may reduce the life of the battery pack.

In an embodiment of the present disclosure, during the charging phase, when the current of the path of the battery pack system reaches the charging current threshold, the path inside the battery pack system may be disconnected, in order to avoid damage to the inside of the battery pack when continuing charging. In this way, the battery pack life can be prevented from being reduced while achieving heating of the battery pack.

In order to ensure the safety of the process of heating the battery pack B1 by the battery pack system, the battery management unit P1 may also be used to send, when the current value of the path of the battery pack system exceeds a safety threshold range, a turn-off instruction to the main switch unit to disconnect battery pack B1 from the discharge circuit unit P2 and the charge circuit unit P3. Alternatively, when the current value of the path formed by the battery pack system exceeds the safety threshold range, a turn-off instruction may be sent to the discharge circuit unit P2 and the charge circuit unit P3 to disconnect the battery pack B1 from the discharge circuit unit P2 and the charge circuit unit P3. Alternatively, when the current value of the path of the battery pack system exceeds the safety threshold range, a turn-off instruction may be sent to the main switch unit, the discharge circuit unit P2 and the charge circuit unit P3 to disconnect the battery pack B1 from the discharge circuit unit P2 and the charge circuit unit P3. The battery management unit P1 may first send a turn-off instruction to the main switch unit, and then send a turn-off instruction to the discharge circuit unit P2 and the charge circuit unit P3. Thus, the main switch unit may be turned off first, and then the discharge circuit unit P2 and the charge circuit unit P3 may be turned off. The safety threshold range may be a range of safe current that the battery pack system can withstand, and may be set according to operating scenarios and operating requirements. The present disclosure is not limited in this respect.

When the current value of the path formed by the battery pack system exceeds the safety threshold range, it may be indicated that there is a fault in the battery pack system. It is necessary to cut off the path inside the battery pack system. That is to say, an open circuit is needed for the path(s) inside the battery pack system. The battery management unit P1 may also record the fault for the user or operator to view and perform repair or check based on the fault record.

It is also possible to arrange a temperature sensor in each unit of the battery pack system to monitor the temperature of each unit of the battery pack system. The battery management unit P1 may also be used to monitor a component temperature parameter(s) and send, when the component temperature parameter(s) exceeds a component temperature threshold range, a turn-off instruction to the main switch unit, and/or the discharge circuit unit P2 and the charge circuit unit P3 to disconnect paths of the battery pack B1 with the discharge circuit unit P2 and the charge circuit unit P3. The component temperature parameter(s) may include at least one of a temperature of the discharge circuit unit P2, a temperature of the charge circuit unit P3, a temperature of the energy storage unit P4, and a temperature of the main switch unit.

The component temperature threshold range is the temperature range in which a component operates safely. If the component temperature parameter(s) is outside the component temperature threshold range, the battery pack system may fail. It is necessary to cut off the path(s) inside the battery pack system. That is to say, an open circuit is need for the path(s) inside the battery pack system. The battery management unit P1 may also record faults for the user or operator to view and to perform repair or check according to the fault record.

The component temperature parameter of each unit in the battery pack system may be monitored to determine whether the battery pack system is operating safely. When the component temperature parameter(s) exceeds the component temperature threshold range, the path(s) inside the battery pack system may be cut off timely to stop heating of the battery pack B1. As a result, further damage to the battery pack system can be avoided and stable and safe operation of the battery pack system can be ensured.

Figure 6:
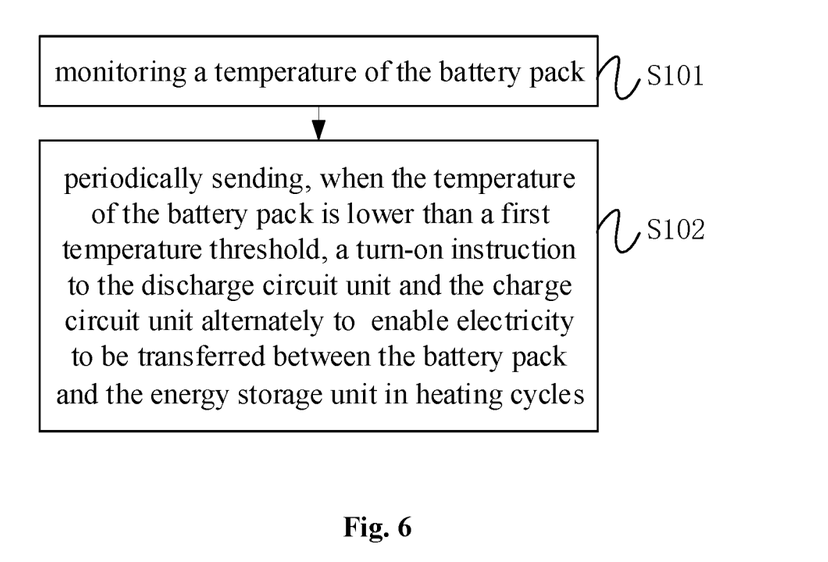
FIG. 6 is a flowchart of a method for controlling a battery pack system according to an embodiment of the present disclosure.

FIG. 6 is a flowchart of a method for controlling a battery pack system according to an embodiment of the present disclosure. The method for controlling a battery pack system may be applicable to the battery pack system in the above embodiments. The method for controlling a battery pack system may be performed by the battery management unit in the battery pack system. In an example, the battery pack system may be arranged inside an electric car, and the method for controlling a battery pack system may be performed by the BMS of the electric car. As shown in FIG. 6, the method for controlling a battery pack system may include step S101 and step S102.

In step S101, the temperature of the battery pack is monitored.

In step S102, if the temperature of the battery pack is lower than the first temperature threshold, the turn-on instruction is periodically sent to the discharge circuit unit and the charge circuit unit alternately, so that the electricity is transferred between the battery pack and the energy storage unit during the heating cycle.

The heating cycle may include a charging phase and a discharging phase. The total duration of the discharging phases of all heating cycles is greater than the total duration of the charging phases of all heating cycles. The transferring of the electricity between the battery pack and the energy storage unit may include the electricity of the battery pack flowing into the energy storage unit and the electricity of the energy storage unit flowing into the battery pack for multiple cycles.

In an example, the duration of the discharging phase is greater than the duration of the charging phase during each heating cycle.

In an example, the heating cycle may also include a dead-time phase. During the dead-time phase, both of the discharge circuit unit and the charge circuit unit are turn-off.

For example, the battery pack system is as shown in FIG. 2. If the temperature of the battery pack is lower than the first temperature threshold, the battery management unit may first send a turn-on instruction to the main switch unit to turn on the main switch unit. The battery management unit may send a turn-on instruction to the first switch and the second switch of the discharge circuit unit so that the first switch and the second switch are closed to enable connection of the battery pack, the discharge circuit unit, and the energy storage unit. Thereafter, the battery management unit may stop transmitting the turn-on instruction to the first switch and the second switch of the discharge circuit unit. The battery management unit may send a turn-on instruction to the third switch and the fourth switch of the charge circuit unit, so that the third switch and the fourth switch are closed to enable connection of the energy storage unit, the charge circuit unit and the battery pack. The discharge circuit unit and the charge circuit unit may be alternately turned on.

Figure 7:
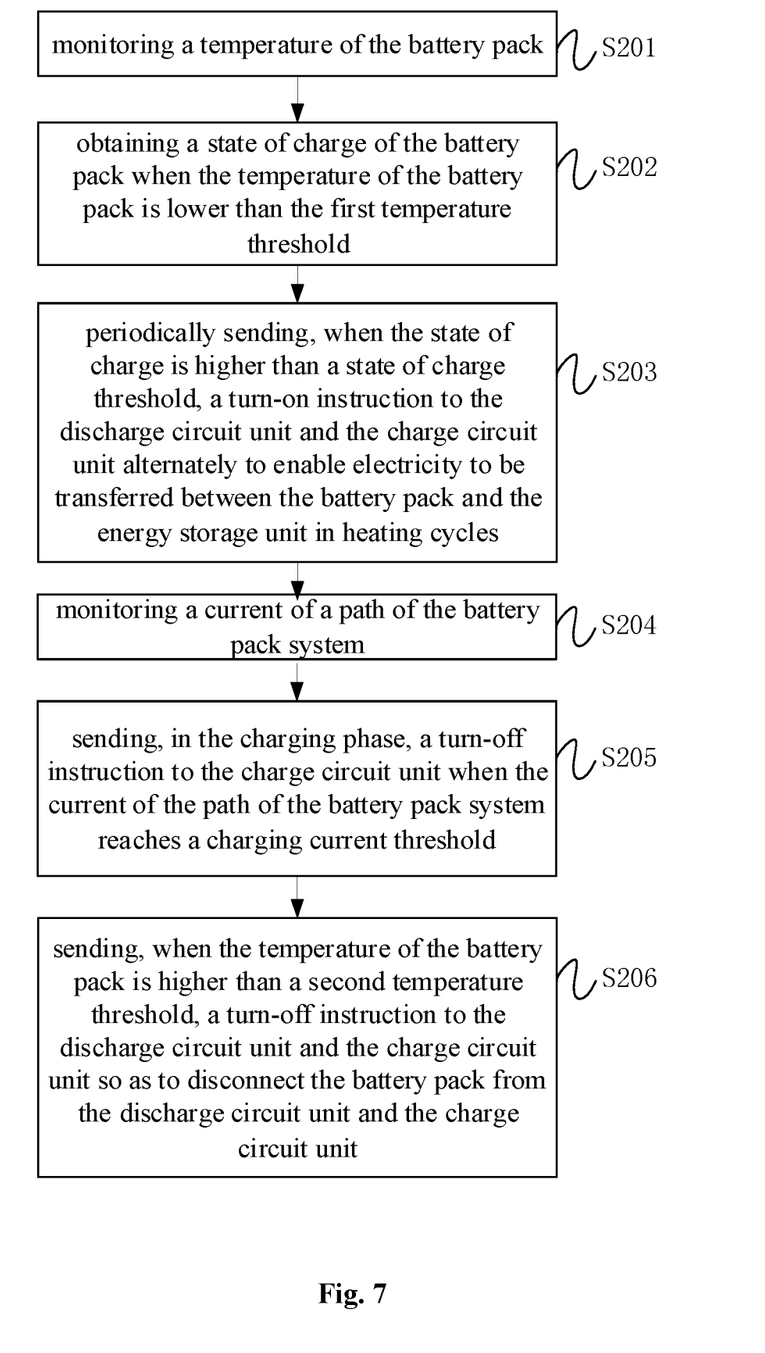
FIG. 7 is a flowchart of a method for controlling a battery pack system according to another embodiment of the present disclosure.

FIG. 7 is a flowchart of a method for controlling a battery pack system according to another embodiment of the present disclosure. As shown in FIG. 7, the method for controlling a battery pack system may include steps S201 to S206.

In step S201, the temperature of the battery pack is monitored.

In step S202, if the temperature of the battery pack is lower than the first temperature threshold, the SOC of the battery pack is acquired.

In step S203, if the SOC is higher than the SOC threshold, a turn-on instruction is periodically and alternatively to the discharge circuit unit and the charge circuit unit, so that the electricity is transferred between the battery pack and the energy storage unit during the heating cycle.

In step S204, the current of the path of the battery pack system is monitored.

In step S205, in the charging phase, when the current of the path of the battery pack system reaches the charging current threshold, a turn-off instruction is sent to the charge circuit unit.

In step S206, if the temperature of the battery pack is higher than the second temperature threshold, a turn-off instruction is sent to the discharge circuit unit and the charge circuit unit to disconnect the battery pack from the discharge circuit unit and the charge circuit unit.

In an example, if the monitored current of the path of the battery pack system exceeds the safety threshold range, the battery management unit may also send a turn-off instruction to the main switch unit, and/or the discharge circuit unit and the charge circuit unit to disconnect the battery pack from the discharge circuit unit and the charge circuit unit.

In an example, the battery management unit may also monitor a component temperature parameter(s). If the component temperature parameter(s) exceeds the component temperature threshold range, the battery management unit may also send a turn-off instruction to the main switch unit, and/or the discharge circuit unit and the charge circuit unit to disconnect the battery pack from the discharge circuit unit and the charge circuit unit.

The component temperature parameter(s) may include at least one of the temperature of the discharge circuit unit, the temperature of the charge circuit unit, the temperature of the energy storage unit, and the temperature of the main switch unit.

The detailed steps and beneficial effects of the method for controlling a battery pack system may make a reference to the related content of the battery pack system in the above embodiments, which are not described here again.

Figure 8:
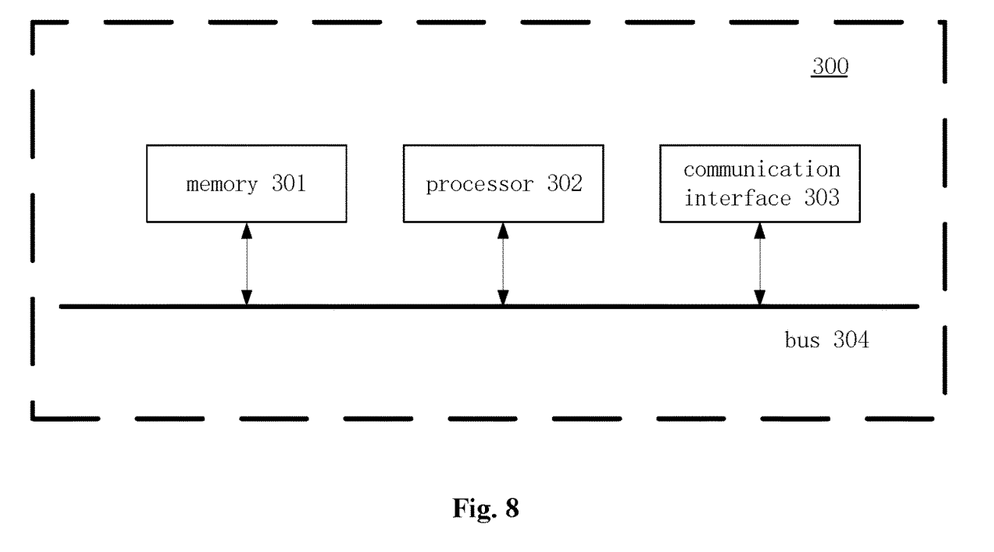
FIG. 8 is a structure diagram of hardware of a management device according to an embodiment of the present disclosure.

The battery pack system and the control method thereof according to the embodiments of the present disclosure described in conjunction with FIGS. 1 to 7 may be implemented by a management device. FIG. 8 is a structure diagram of hardware of a management device 300 according to an embodiment of the present disclosure.

The management device 300 may include a memory 301, a processor 302, and a computer program which is stored in the memory 301 and executable in the processor 302.

In an example, the processor 302 described above may include a central processing unit (CPU) or an disclosure specific integrated circuit (ASIC), or may be configured to one or more integrated circuits to implement the embodiments of the present disclosure.

The memory 301 may include a mass memory for data or instructions. By way of example but not limitation, the memory 301 may include a HDD, a floppy disk drive, a flash memory, an optical disk, a magneto-optical disk, a magnetic tape, or a universal serial bus (USB) drive, or a combination of two or more above. The memory 301 may include a removable or non-removable (or fixed) medium in an appropriate situation. The memory 301 may be internal or external to the management device 300 in an appropriate situation. In a particular embodiment, the memory 301 is a non-volatile solid memory. In a particular embodiment, the memory 301 may include a read only memory (ROM). In an appropriate situation, the ROM may be a mask programmed ROM, a programmable ROM (PROM), an erasable PROM (EPROM), an electrically erasable PROM (EEPROM), an electrically alterable ROM (EAROM) or flash memory or a combination of two or more above.

The processor 302 may read the executable program code stored in the memory 301 and run a program corresponding to the executable program code to perform the method for controlling a battery pack system in above various embodiments.

In an example, the management device 300 may also include a communication interface 303 and a bus 304. As shown in FIG. 8, the memory 301, the processor 302 and the communication interface 303 may be connected through the bus 304 and enable communication with each other.

The communication interface 303 may be mainly used to implement communication between modules, devices, units and/or devices in the embodiments of the present disclosure. Input devices and/or output devices may also be accessed via the communication interface 303.

The bus 304 may include hardware, software, or both, and may couple components of the management device 300 to each other. By way of example but not limitation, the bus 304 may include an accelerated graphics port (AGP) or other graphics bus, an enhanced industry standard architecture (EISA) bus, a front side bus (FSB), a Hyper Transfer (HT) interconnection, an industry standard architecture (ISA) bus, an infinite bandwidth interconnect, a low pin count (LPC) Bus, a memory bus, a micro channel architecture (MCA) bus, a peripheral component interconnect (PCI) Bus, a PCI-Express (PCI-X) bus, an serial advanced technical attachment (SATA) bus, a video electronics standards association local (VLB) bus or other suitable buses or a combination of two or more above. The bus 304 may include one or more buses in an appropriate situation. Although a particular bus is described and illustrated in the disclosure, any suitable bus or interconnection may also be used in the present disclosure.

An embodiment of the present disclosure further provides a storage medium on which a program is stored. When the program is executed by the processor, the method for controlling a battery pack system in the above various embodiments may be implemented.

The various parts of the specification are described in a progressive manner. The same or similar parts among the various embodiments may be referred to each other, and each embodiment focuses on an emphasis different from other embodiments. In particular, for the method embodiments, device embodiments, and storage medium embodiments, they are substantially similar to the embodiments for the battery pack system, so the description is relatively simple, and the relevant portions may be referred to the description for the embodiments for the battery pack system.

The above is only detailed description of the present disclosure, but the protection scope of the present disclosure is not limited thereto. Any person skilled in the art may be able to readily make changes or substitutions within the protection scope of the present disclosure, which are covered by the protection scope of the present disclosure. Therefore, the protection scope of the present disclosure should be determined by the claims.

What is claimed is:

1. A battery pack system comprising a battery pack, a battery management unit, a discharge circuit unit, a charge circuit unit and an energy storage unit, wherein:
the battery pack is connected in series with the discharge circuit unit, and the battery pack is connected in series with the charge circuit unit;
the battery management unit is connected to the discharge circuit unit, the charge circuit unit and the battery pack, the battery management unit is configured to monitor a temperature of the battery pack and a state of charge (SOC) of the battery pack, and when the temperature of the battery pack is lower than a first temperature threshold and the SOC of the battery pack is higher than a SOC threshold, periodically send a turn-on instruction to the discharge circuit unit and the charge circuit unit alternately to control the discharge circuit unit and the charge circuit unit to be alternately turned on in each of heating cycles, wherein each of the heating cycles comprises a discharging phase and a charging phase;
the discharge circuit unit is connected to the energy storage unit, and the discharge circuit unit is configured to turn on the discharge circuit unit according to the turn-on instruction to enable electricity of the battery pack to flow into the energy storage unit in the discharging phase;
the charge circuit unit is connected to the energy storage unit, and the charge circuit unit is configured to turn on the charge circuit unit according to the turn-on instruction to enable electricity of the energy storage unit to flow into the battery pack in the charging phase;

the energy storage unit is configured to store and release electricity; and a total duration of discharging phases of all of the heating cycles is greater than a total duration of charging phases of all of the heating cycles.

2. The battery pack system of claim 1, wherein in each of the heating cycles, a duration of the discharging phase is greater than a duration of the charging phase.

3. The battery pack system of claim 1 wherein the heating cycle further comprises a dead-time phase during which both of the discharge circuit unit and the charge circuit unit are turned off.

4. The battery pack system of claim 1, wherein the battery back system further comprises a current detecting unit, the current detecting unit is connected to the battery pack, the battery management unit, the discharge circuit unit and the charge circuit unit, and the current detecting unit is configured to monitor a current of a path of the battery pack system; and the battery management unit is further configured to send, in the charging phase, a turn-off instruction to the charge circuit unit when the current of the path of the battery pack system reaches a charging current threshold.

5. The battery pack system of claim 1, wherein the battery pack system further comprises a main switch unit, the main switch unit is connected to the battery pack, and the main switch unit is configured to control whether the electricity of the battery pack flows into the discharge circuit unit or the charge circuit unit.

6. The battery pack system of claim 1, wherein the battery management unit is further configured to send, when the temperature of the battery pack is higher than a second temperature threshold, a turn-off instruction to the discharge circuit unit and the charge circuit unit so as to disconnect the battery pack from the discharge circuit unit and the charge circuit unit.

7. A method for controlling the battery pack system of claim 1, comprising:
monitoring a temperature of the battery pack and a state of charge (SOC) of the battery pack; and
periodically sending, when the temperature of the battery pack is lower than a first temperature threshold and the SOC of the battery pack is higher than a SOC threshold, a turn-on instruction to the discharge circuit unit and the charge circuit unit alternately to enable electricity to be transferred between the battery pack and the energy storage unit in heating cycles, wherein each of the heating cycles comprises a discharging phase and a charging phase, and a total duration of discharging phases of all of the heating cycles is greater than a total duration of charging phases of all of the heating cycles.

8. The method of claim 7, wherein in each of the heating cycles, a duration of the discharging phase is greater than a duration of the charging phase.

9. The method of claim 7, wherein the heating cycle further comprises a dead-time phase during which both of the discharge circuit unit and the charge circuit unit are turned off.

10. A management device comprising a memory, a processor and a program stored in the memory and executable in the processor, wherein the program, when executed by the processor, causes the processor to perform the method of claim 9.

11. The method of claim 7, further comprising:
monitoring a current of a path of the battery pack system; and
sending, in the charging phase, a turn-off instruction to the charge circuit unit when the current of the path of the battery pack system reaches a charging current threshold.

12. A management device comprising a memory, a processor and a program stored in the memory and executable in the processor, wherein the program, when executed by the processor, causes the processor to perform the method of claim 11.

13. The method of claim 7, wherein periodically sending, when the temperature of the battery pack is lower than a first temperature threshold and the SOC of the battery pack is higher than a SOC threshold, a turn-on instruction to the discharge circuit unit and the charge circuit unit alternately comprises:
sending, when the temperature of the battery pack is lower than a first temperature threshold and the SOC of the battery pack is higher than the SOC threshold, a turn-on instruction to the main switch unit, to enable electricity of the battery pack to flow into the discharge circuit unit or the charge circuit unit; and
periodically sending the turn-on instruction to the discharge circuit unit and the charge circuit unit alternately.

14. A management device comprising a memory, a processor and a program stored in the memory and executable in the processor, wherein the program, when executed by the processor, causes the processor to perform the method of claim 13.

15. The method of claim 7, further comprising:
sending, when the temperature of the battery pack is higher than a second temperature threshold, a turn-off instruction to the discharge circuit unit and the charge circuit unit so as to disconnect the battery pack from the discharge circuit unit and the charge circuit unit.

16. A management device comprising a memory, a processor and a program stored in the memory and executable in the processor, wherein the program, when executed by the processor, causes the processor to perform the method of claim 15.

17. A management device comprising a memory, a processor and a program stored in the memory and executable in the processor, wherein the program, when executed by the processor, causes the processor to perform the method of claim 7.

* * * * *